Oct. 13, 1942.                C. W. MULLER                2,298,305
       RECORDING APPARATUS FOR USE WITH AVIATION GROUND TRAINERS
                  Filed Dec. 8, 1941        4 Sheets-Sheet 1

Fig. 1.

INVENTOR
CARL W. MULLER
BY
ATTORNEYS

Oct. 13, 1942.   C. W. MULLER   2,298,305
RECORDING APPARATUS FOR USE WITH AVIATION GROUND TRAINERS
Filed Dec. 8, 1941   4 Sheets-Sheet 2

INVENTOR
CARL W. MULLER
BY
ATTORNEYS

Oct. 13, 1942.   C. W. MULLER   2,298,305
RECORDING APPARATUS FOR USE WITH AVIATION GROUND TRAINERS
Filed Dec. 8, 1941   4 Sheets-Sheet 4

FIG.5.

INVENTOR
CARL W. MULLER
BY
ATTORNEYS

Patented Oct. 13, 1942

2,298,305

UNITED STATES PATENT OFFICE 2,298,305

RECORDING APPARATUS FOR USE WITH AVIATION GROUND TRAINERS

Carl W. Muller, Osborn, Ohio

Application December 8, 1941, Serial No. 422,098

20 Claims. (Cl. 35—12)

(Granted under the act of March 3, 1883, as amended April 30, 1928; 370 O. G. 757)

The invention described herein may be manufactured and used by or for Government for governmental purposes, without the payment to me of any royalty thereon.

This invention relates to auxiliary apparatus for use in conjunction with aviation ground training apparatus such as the well-known "Link" trainer, whereby ground instruction of students in problems involving the navigation of aircraft from moving bases, such as aircraft carriers, wherein the aircraft is assumed to fly from the base to intercept a moving target or to proceed on a patrol mission and then return to the base, may be accomplished in a simple manner and a permanent record made of all factors involved in a particular problem.

In copending application Serial No. 320,880, filed February 26, 1940, for "Interception trainer," in the names of Carl J. Crane, George V. Holloman, Carl W. Muller, and Raymond K. Stout, one partial solution of the problem of providing such instruction is disclosed and claimed, wherein transparent tables were placed one over the other, upon which the course recorder controlled by the trainer and a recorder simulating a target object were respectively operated, the interception of the respective courses of each being visually determined by the instructor; and this application further disclosed the use of a moving transparent belt or belts to cause a displacement of the respective recorders to simulate the drift effects of winds or tides. This apparatus, while satisfactory in certain respects, did not provide for simulating operation from a moving base—i. e., after the simulated interception was accomplished, no provision for simulating the return of the aircraft to a moving base was provided—and further it was not possible to make a record of all of the factors involved in the problem, and hence there was no way of checking the solution of the problem to rectify faulty navigation on the part of the student.

The development by Carl J. Crane of a very simple wind-simulating device such as disclosed and claimed in his copending application Serial No. 334,002, entitled "Apparatus for simulating wind effects," forms the basis of the present invention, which employs a plurality of such devices in a manner that a complete solution and record of problems involving operation from moving bases may be accomplished. It is of course to be understood that the construction per se of such devices as disclosed in either of the aforementioned copending applications forms no part of the present invention.

In accordance with the present invention, the conventional course recorder such as employed with the "Link" trainer and directionally controlled thereby, is supported for movement on a supporting surface having a record chart thereon, the surface itself being secured to a movable carriage similar to the wind-simulating device disclosed in the aforementioned copending application Serial No. 334,002, the carriage itself being provided with tracing means adapted to trace the course of the assumed wind on a chart placed on a supporting table. Then if the trainer recorder is placed in operation under the directional control of the trainer, the recorder will trace the assumed course of the simulated flight of an aircraft represented by the trainer, upon the chart carried by the wind-simulating carriage representing the so-called air track of the assumed flight of the aircraft, and similarly the wind-simulating carriage traveling in a known direction and velocity traces the wind factors on the associated chart placed on the supporting table.

In order to simulate operation from a moving base, a second carriage similar to the wind-simulating carriage is provided, which has secured thereon a suitable chart-supporting surface, and the carriage is set in motion over the supporting table for movement relative to a chart placed thereon, in a direction and at a velocity corresponding to the assumed direction and proportional to the assumed velocity of the moving base, representing, for example, an aircraft carrier. A tracer arm carried by the trainer recorder is adapted to trace the course of the assumed flight of the aircraft relative to the moving base on the chart carried by the second carriage and, since the second carriage traces its our course on an associated stationary chart, a record of all of the factors necessary to criticize the solution of a problem is provided. When the recording marker which traces on the chart carried by the second carriage is started at a definite point on the chart representing the position of the aircraft carrier, if the problem is correctly solved, the marker should again coincide with the starting point at the conclusion of the problem, and thus the correctness of the solution is visually apparent on a permanent record.

To extend the use of the above-described apparatus to make it possible to solve interception problems, a third carriage having a chart-supporting surface is provided for movement over the supporting table relative to an associated stationary chart upon which the third carriage traces the course of the target object represented thereby, such as an enemy ship. A second tracing arm carried by the trainer course recorder is provided for tracing the relative motion between the assumed flight of an aircraft relative to the simulated target object on a chart carried on the supporting surface of the third carriage. If the chart carried by the third carriage is marked—preferably at a point directly over the marker carried by the third carriage, employed for tracing the course of the target object—and the marked point and the marker are placed over a selected starting point on the record chart on the table on which the third carriage marker records, then if the interception problem is correctly solved, the marker on the second tracer arm should pass through the said marked point on the chart carried by the said third carriage, and a complete trace of the interception problem is left on the chart carried by the third carriage.

It is therefore the principal object of the invention to provide, in conjunction with an aviation ground trainer for simulating the flight of an aircraft and a course recorder therefor, movable means for simulating the course of a moving base such as an aircraft carrier, or of a target object, relative to the assumed flight course of an aircraft represented by said trainer, and recording means carried by the course recorder for tracing the relative movement between the moving base or the target object and the assumed course of the aircraft, on a record sheet carried by the movable means.

It is another object of the invention to provide, in conjunction with an aviation ground trainer for simulating the flight of an aircraft and a recorder therefor, means for moving said recorder over a supporting surface in a direction and at a velocity corresponding to the direction and velocity of a wind assumed to be acting on said aircraft, means movable relative to the supporting surface in a manner representing a moving base from which said aircraft is assumed to depart and return, and tracing means carried by the course recorder for tracing the course of the assumed flight of the aircraft relative to the said moving base upon a chart carried by said last-named movable means.

It is a further object of the invention to provide means whereby the simulated flight course of an aircraft as represented by the controlled movement of a ground trainer course recorder may be correlated to the movement of a chart carried by a means movable over a supporting surface in a manner simulating the course of a target object such that a tracing means carried by the course recorder is adapted to trace the simulated flight course of the said aircraft relative to the simulated course of the target object, on the record sheet.

Other objects of the invention will become apparent by reference to the following detailed description and to the appended drawings in which.

Figure 1:
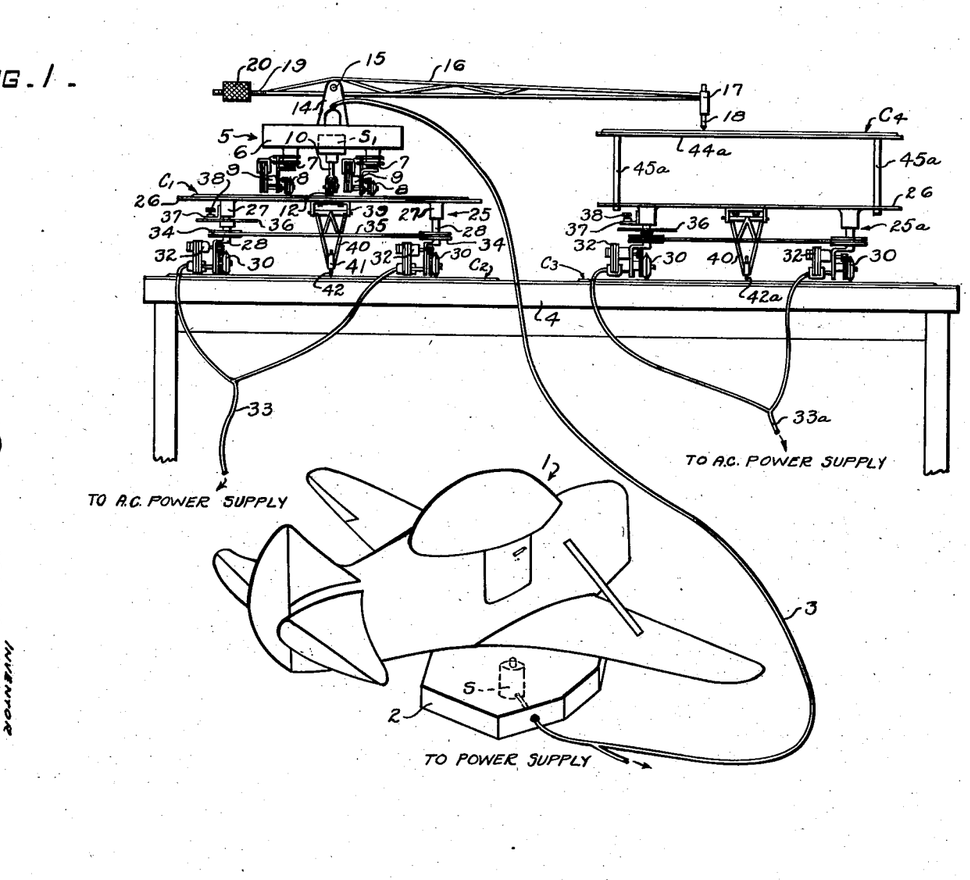
Fig. 1 is an assembly view illustrating the arrangement of the component elements of the invention for the solution of navigation problems involving a moving base.

Referring now to Fig. 1, the reference numeral 1 generally indicates an aviation ground trainer of the character illustrated and described in United States Patents Nos. 1,825,462 and 2,099,857 granted to Edwin A. Link, Jr., and comprising a fuselage serving as a cockpit enclosure for the student receiving the instruction, which is tiltably and rotatably mounted on a base 2 and adapted, through means controlled by the student, to simulate the various attitudes of an aircraft during flight. The trainer is provided with a self-synchronous transmitter unit S electrically connected by means of conductors in the conduit 3 to a corresponding self-synchronous receiver $S_1$ which is mounted on the course indicator 5, which also is of well-known construction, and illustrated and described in United States Patent No. 2,179,663 granted to Edwin A. Link, Jr. As the trainer 1 is rotated in azimuth about the base 2, the self-synchronous transmitter S causes a corresponding angular rotation of the rotor in the receiver unit $S_1$ which controls the azimuth heading of the recorder 5 to at all times correspond to the instant heading of the trainer 1.

Figure 2:
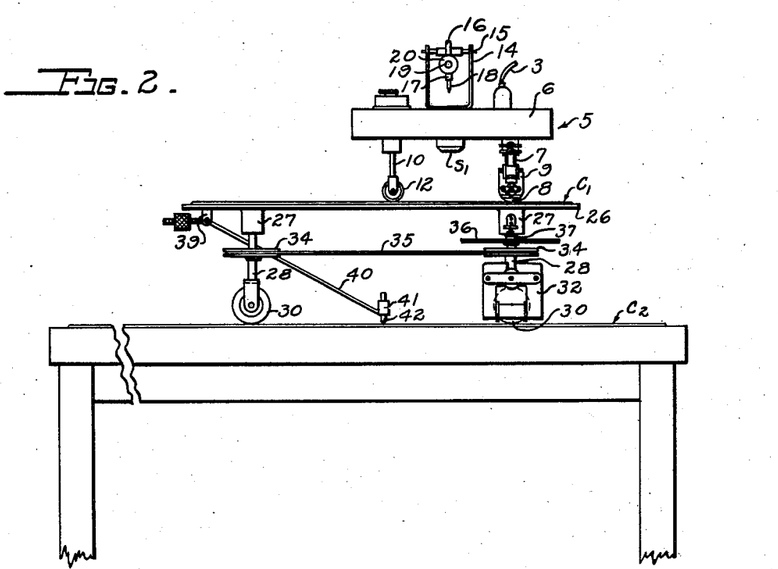
Fig. 2 is a side elevation view illustrating the details of the wind-simulating carriage and the trainer course indicator illustrated in Fig. 1.

The recorder 5, as seen in Figs. 1 and 2, is provided with a frame or base 6 which serves as a bearing support for rotatable spindles 7, each of which serves as a mounting for a supporting roller 8, the rollers 8 being adapted to be driven by means of small, geared-head, synchronous motors 9 which are supplied with current of a selected frequency such that the recorder 5 will be propelled in translation relative to the trainer table 4 at a velocity corresponding in some predetermined scale to the assumed velocity in flight of an aircraft represented by the trainer 1. The recorder 5 is also provided with a downwardly depending steerable spindle 10 which serves as a mounting for a supporting roller 12, which may be inked by any suitable means (not shown) to leave a trace of the recorder's movement on a suitable map or chart such as $C_1$. The spindles 7 and 10 are each respectively geared to the rotor of the self-synchronous receiver $S_1$ such that rotation of the rotor causes an equal and simultaneous change in the azimuth heading of the rollers 8 and 12 and, as previously noted, the receiver $S_1$ is thus adapted to control the heading of the course indicator 5 so that the same always corresponds to the instant heading of the trainer 1. The above-described ground trainer and recorder being well known in the art, the construction thereof per se forms no part of the present invention.

The conventional recorder 5 is provided with a vertically extending U-shaped frame 14 which serves as a mounting for a pivot 15 to which is secured a long tracer arm 16 made, for example, of light aluminum tubing and provided at its outer end with a holder element 17 in which is secured a suitable marker 18 which may be, for example, a pencil or inking pen which is adapted to trace a record as will be hereinafter more fully explained. At its other end the tracer arm 16 is provided with a threaded extension 19 on which is mounted an adjustable counterbalance weight 20, by means of which the pressure of the marker 18 may be regulated.

For the purposes of introducing the factor of wind into the respective trainer problems a wind-simulating carriage is employed of the same general construction as disclosed in the aforementioned co-pending application of Carl J. Crane, Serial No. 334,002 and the construction of which per se also forms no part of the present invention, but in order to give a clear understanding of the invention a description of the wind simulator will now be given. The wind-simulating carriage generally indicated by the reference numeral 25, as seen in detail in Figs. 1 and 2, is provided with a table portion 26 which serves as a support for the course recorder 5 which is adapted to trace a record on the chart $C_1$ placed on the table 26. The table 26 of the wind-simulating carriage 25 serves as a main frame which is provided with downwardly depending bearing bosses 27 which, as shown, are four in number and each adapted to rotatably journal a steerable spindle 28 which serves as mounting means for rollers 30 secured to the lower end thereof, two of the rollers 30 being adapted to be propelled by means of small synchronous motors 32 which may be supplied with alternating current of a selected frequency such that the carriage 25 will be propelled in translation over the chart $C_2$ on the trainer table 4 at a velocity proportional in a predetermined scale to the velocity of an assumed wind. Each of the spindles 28 has mounted thereon a pulley 34, which pulleys are interconnected by means of a cable 35 which serves to transmit rotation from one spindle to the other. One of the spindles is provided with a metal dial 36 which on its upper surface is provided with suitable azimuth indicia, and the dial 36 cooperates with a pointer 37 fixed to the frame 26, the pointer also having secured thereto a friction stop 38 whereby the dial 36 may be locked in any desired position. By orientating the carriage frame and table 26 such that a selected axis thereof coincides, for example, with a north-south line, the dial 36 may be rotated, and through the pulleys 34 and cable 35 rotate all of the spindles 28 so that the respective rollers 30 have an azimuth heading corresponding to the heading indicated on the scale 36 relative to a north-south line. If then the motors 32 are energized, the wind-simulating carriage 25 will be propelled in translation over the surface of a chart $C_2$ supported on the table 4 with a velocity and heading corresponding in a predetermined scale to the velocity and heading of an assumed wind. The wind-simulating carriage table 26 has a bracket 39 secured to the under side thereof which serves as a pivotable support for a tracer arm 40, the latter having a suitable holder 41 secured to its outer end, which serves to retain a suitable marker 42 which is adapted to trace the course of the assumed wind on the chart $C_2$. By changing the frequency of the alternating current supplied to motors 32, the velocity of the wind-simulating carriage may be changed at will; or by employing different gear ratios in the motors, the various desired simulated wind speeds may be obtained.

In order to provide apparatus for the solution of problems involving operation from a moving base, there is provided, as seen in Fig. 1, a second carriage 25a identical in construction with the wind-simulating carriage 25, previously described, which may be propelled over the surface of a chart $C_3$ supported on table 4, in a direction corresponding to the simulated heading of the moving base representing, for example, an aircraft carrier and having a speed proportional in accordance with the scale of chart $C_3$ to the assumed speed of the aircraft carrier. The marker 42a of the carriage 25a is adapted to trace the course of the simulated moving base on the chart $C_3$ in the same manner as the marker 42 traces the path of the assumed wind on the chart $C_2$. The carriage 25a is provided with vertical supports 45a secured at their lower ends to the table 26 and serving to support a table 44a mounted on the upper ends thereof and, in turn, carrying a chart $C_4$ upon which the marker 18 is adapted to make a trace.

*Operation*

Prior to placing trainer 1 into operation, the instructor sets the direction of the assumed wind in the wind-simulating carriage 25 by means of rotating dial 36 relative to pointer 37 in the manner as previously noted and selects the simulated velocity of the wind by proper selection of the frequency of supply for motors 32, or by using a gear reduction having the proper value so that when motors 32 are energized the wind-simulating carriage 25 will be propelled over the surface of chart $C_2$ in a direction corresponding to the direction of the assumed wind and having a velocity proportional to the velocity of the assumed wind. The marker 42 will then trace the course of the assumed wind on the chart $C_2$, and this trace will also represent the wind vector, since the velocity of the carriage 25 is known. At any time during the conduct of the problem the instructor may change the wind direction at will. When the trainer 1 is to be placed in operation, the frame 6 of the course recorder 5 is properly orientated with respect to a north-south line, as is customary in the art, and upon energizing motors 9 from a suitable source of alternating current the course recorder 5 will be propelled over the surface of chart $C_1$ carried upon the wind-simulating carriage 25 at a velocity corresponding in a predetermined scale to the velocity of flight of an aircraft represented by the trainer 1, and the heading of the course recorder 5 will be directionally controlled by the trainer in the manner previously noted.

Figure 3:
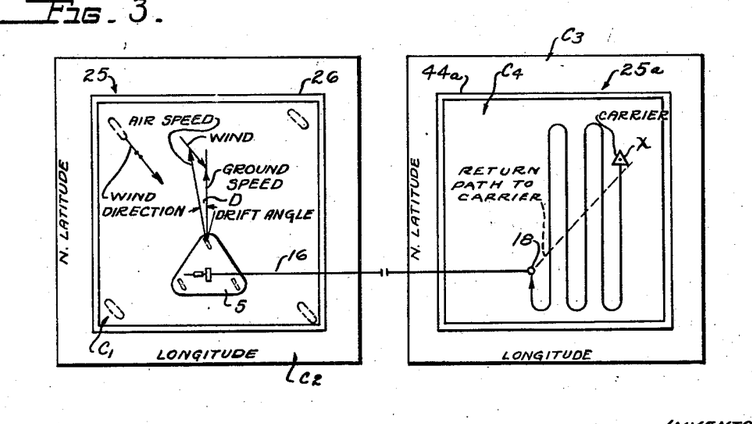
Fig. 3 is a top plan view of the recording apparatus illustrated in Fig. 1.

After the trainer 1 is placed in operation, the wind-simulating carriage 25 will bodily displace the course recorder 5 in a direction corresponding to the direction of the assumed wind and with a velocity proportional to the velocity of the assumed wind (for example, as illustrated in Fig. 3). The student in the trainer, knowing the velocity and direction of the assumed wind, must accordingly change the trainer heading to compensate for the effect of drift, depending upon the selected course—the drift angle being, for example, illustrated on chart $C_1$ in Fig. 3—and at any time during the conduct of the problem that the wind direction or velocity is changed the student may accordingly note such change in his navigation computations. By knowing the assumed velocity of flight represented by the speed of the course recorder 5, the student may, on a suitable map, chart the instant position of the assumed flight of the aircraft represented by the trainer, since the assumed ground speed may be readily calculated by any well-known method.

Prior to placing the trainer in operation, the tables 26 and 44a of the carriage 25a are properly orientated with respect to a north-south line— the map $C_4$ also being properly orientated upon the table 44a—and the marker 18 is placed directly over a marked point on the chart $C_4$ having a known latitude and longitude with respect to positions indicated by chart $C_4$. This marked point, such as X, Fig. 3, indicates the aircraft carrier or other moving base from which the assumed flight of the aircraft is to begin and end. The instructor also selects the heading and velocity of the moving base by adjusting the heading and determining the speed of the carriage 25a in exactly the same manner as previously described with reference to the wind-simulating carriage 25, so that the motion of the carriage 25a simulates the course of the moving base, and the point X on the chart C₄ is thus displaced with a velocity proportional to the assumed velocity of the moving base and in a direction corresponding to the assumed course of the moving base. The student, knowing the assumed latitude and longitude of the moving base, may plot the initial position of the same on his map and also plot the assumed course of the moving base which, of course, may be changed by the instructor from time to time, the student being informed of such course changes by telephonic communication.

After the trainer is placed in operation, the marker 18 will move relative to the point X on the chart C₄ to indicate the assumed flight course of the aircraft represented by the trainer 1, relative to the moving base, and the student may so operate the trainer as to simulate a patrol flight, or flight to some definite destination, at all times keeping in mind the elapsed time from the beginning of the assumed flight, and thus may, by dead reckoning or other methods of navigation, check his instant position on the map relative to the course and instant position of the moving base represented by the point X on the chart C₄; and after the assumed mission of the problem is carried out, the student may so control the trainer as to simulate the return to the moving base or aircraft carrier represented by the point X on chart C₄, and if all navigation calculations have been properly solved, at the completion of the problem, the marker 18 should again pass through the point X on chart C₄, thus representing a safe return to the aircraft carrier, and at the conclusion of the problem the distance by which the assumed flight of the aircraft failed to intercept the point X may be readily determined, and thus whether or not the assumed return flight was such that the aircraft carrier would have been sighted.

The various charts C₁, C₂, C₃, and C₄ serve as permanent records of all the principal variables employed in the problem, and the record left on chart C₄ is irrefutable evidence as to the correctness of the solution of the particular navigation problem which the student is required to solve. By thus providing definite records, the solution of the problem may be clearly discussed and criticized by the instructor at the completion thereof, and further the student is imbued with confidence because of the fact that the errors in the solution were not merely those revealed by the personal observation of the instructor, but rather also apparent upon the record, and further such records serve as a valuable aid in comparing the work of one student with the solution of the problems by other students so that comparative standards of accuracy may be determined.

Figure 4:
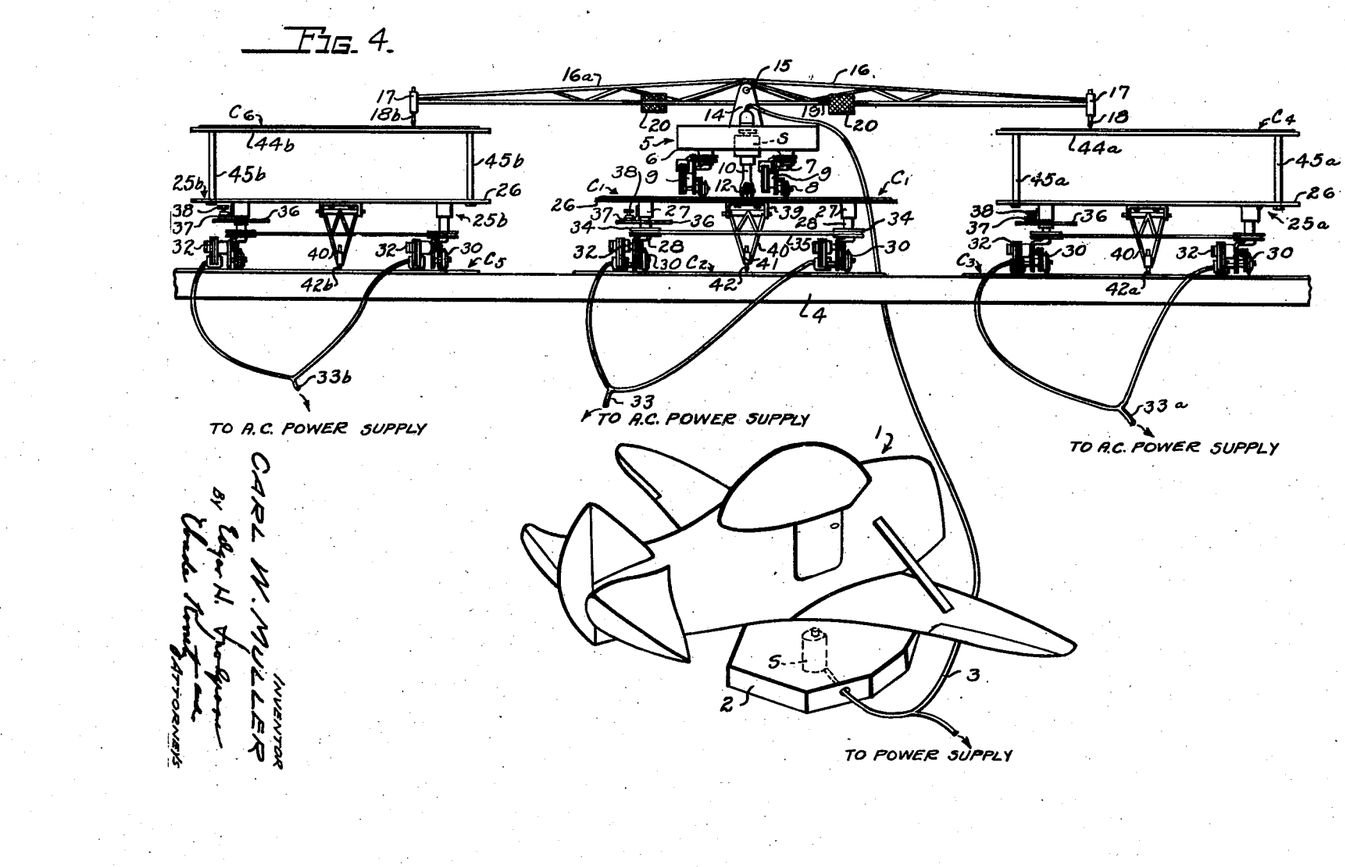
Fig. 4 is an assembly view similar to Fig. 1 illustrating additional apparatus employed for the solution of interception problems.
Figure 5:
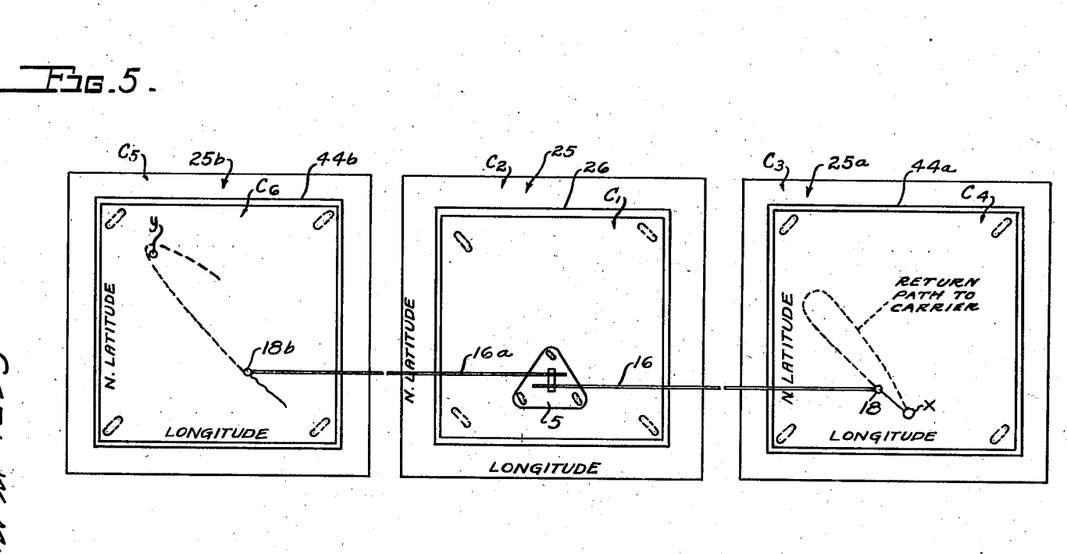
Fig. 5 is a top plan view of the apparatus illustrated in Fig. 4.

In order to provide apparatus for simulating interception of enemy aircraft or the like, and also provide for the feature of departing from and returning to a moving base, the assembly is employed as illustrated in Fig. 4, in which the apparatus including the recorder 5, wind-simulating carriage 25, and the carriage 25a representing the moving base, are identical to those illustrated and described with reference to Figs. 1 to 3 inclusive, similar parts being identified by the same reference numerals; and in addition to the apparatus of Fig. 1, there is provided a second carriage 25b identical in construction with the carriage 25a of Fig. 1, the marker 42b of which is adapted to trace the course of the target object on a chart C₅ mounted on table 4, the carriage 25b being propelled over the chart C₅ in a selected direction and at a velocity corresponding to the heading and proportional to the velocity of the assumed target object, the carriage being operated in the same manner as the wind-simulating carriage 25 and moving-base-simulating carriage 25a of Fig. 1. The second tracer arm 16a, identical in construction with the tracer arm 16 of Fig. 1, is mounted on the pivot 15 carried by the bracket 14 of the course recorder 5, and the marker 18b thereof is adapted to trace a record on a chart C₆ supported on a table 44b of the carriage 25b, relative motion between the marker 18b and a selected point (for example, Y in Fig. 5 on the chart C₆) representing the relative motion between the assumed flight of the aircraft represented by the trainer 1 and the target object represented by the point Y on chart C₆, which is displaced in accordance with the assumed course of the target object represented by the carriage 25b.

The solution of the problem is carried out in a manner similar to that previously described with reference to Figs. 1 to 3 inclusive, except that the student in addition must mark on his chart the position of the target object and so control the trainer that the assumed flight of the aircraft represented thereby will intercept the target object at some predetermined point. From there on the student is, of course, no longer interested in the target object and conducts the problem of return to the moving base in exactly the same manner as above described with reference to Figs. 1 to 3 inclusive.

When initially starting the problem, the instructor places the mark Y on the chart C₆, and places the marker 42b directly over a corresponding point on the chart C₅ representing the assumed latitude and longitude of the target object at the beginning of the problem or when the assumed flight of the aircraft is supposed to commence from the carrier to intercept the target object. Then if the student properly solves the interception portion of the problem, the marker 18b should pass through the point Y showing that the interception has been properly carried out, the trace of the marker 18b relative to the point Y thereafter being of no consequence. By means of the marker 42b a permanent record of the assumed course of the target object is provided, and the trace left by the marker 18b on the chart C₆ shows whether or not the student has properly solved the interception problem under the conditions of the assumed wind represented by the movement of the carriage 25. The portion of the problem relating to the simulated departure from and return to the aircraft carrier is recorded on chart C₄ in the manner as above described with reference to Figs. 1 to 3 inclusive.

It is of course to be understood that with the apparatus disclosed, problems not involving winds may be readily solved simply by maintaining the wind-simulating carriage 25 stationary, and as noted above, the velocity of the wind-simulating carriage 25, moving-base carriage 25a, and target-object carriage 25b, may be selected as desired in accordance with the scale of the charts $C_2$, $C_3$, and $C_5$, so that any combination of wind, speed, and direction—as well as course and speeds of the moving base and target object—may be obtained to vary the conditions of the problem as desired. It is also to be understood that radio direction-finding aids may be employed with the above-described apparatus to, for example, facilitate the assumed return flight of the aircraft represented by the trainer to the carrier represented by point X on the chart $C_4$ carried by the moving-base-simulating carriage $25a$.

While a preferred embodiment of the invention has been illustrated and described, many changes and variations therein will become apparent to those skilled in the art as falling within the scope of the invention as defined by the appended claims.

I claim:

1. In aviation ground training apparatus of the character described, a first record chart, a course recorder directionally controlled by the associated ground trainer for tracing the simulated air path of the assumed flight of an aircraft on said chart, a first carriage adapted to move relative to a supporting surface in a direction and at a velocity corresponding to the direction and proportional to the velocity of an assumed wind, said first carriage serving as a means to physically displace said course recorder and said chart in the direction of the assumed wind, a second carriage movable in a direction and at a velocity equivalent in direction and proportional the the velocity of an assumed moving base, a chart on said second carriage having a point thereon representing said moving base, and tracing means carried by said course recorder and adapted to trace a record on the chart carried by said second carriage representing the course of the assumed flight of said aircraft relative to the point on said chart representing the moving base.

2. The structure as claimed in claim 1, in which said first and said second carriages are each provided with tracing means, and a pair of stationary charts each respectively adapted to cooperate with one of said last-named tracing means whereby the record of the courses of the assumed wind and of the moving base will be obtained.

3. An aviation ground training system for instructing students in the art of navigating an aircraft from and returning to a moving base comprising: an aviation ground trainer rotatable in azimuth under the control of the student occupant thereof, a course recorder directionally controlled by said trainer and power propelled in translation at a velocity proportional to the assumed air speed of an aircraft represented by said trainer, a chart upon which said recorder is adapted to trace the air course of the assumed flight of said aircraft, a supporting means for said chart and recorder movable in translation in a direction corresponding to the direction of an assumed wind and having a velocity proportional to the velocity of said assumed wind, a second carriage movable in translation with a velocity proportional to the velocity of an assumed moving base such as an aircraft carrier and with a heading corresponding to the assumed heading of said moving base, and tracing means carried by and movable with said course recorder, said tracing means being adapted to trace a record of the resultant movement of said course recorder relative to a marked point on a record chart carried by said second carriage, said marked point on the last-named chart representing the assumed moving base.

4. The structure as claimed in claim 3, in which said first and said second carriages are each provided with tracing means, and a pair of stationary charts, each respectively adapted to cooperate with one of said last-named tracing means whereby the course of the assumed wind and of the assumed moving base may be obtained.

5. In an aviation ground training system in which a rotatable ground trainer controlled by a student occupant is adapted to directionally control a course recorder which is propelled in translation over a reference surface at a velocity proportional to the assumed velocity of an aircraft represented by the trainer: the combination with said recorder of a carriage adapted to be propelled in translation over a supporting surface in a direction and at a velocity corresponding to the direction and proportional to the velocity of an assumed moving base such as an aircraft carrier, a chart carried by said carriage and having a marked point thereon representing the said moving base, and recording means mounted on and movable with said course recorder for tracing the course of the assumed flight of said aircraft represented by the trainer on said chart relative to the point thereon representing the moving base.

6. The structure as claimed in claim 5, in which there is provided a movable means for supporting said course recorder for translatory movement thereon, said movable means being adapted to physically transport said course recorder in a direction and at a velocity corresponding to the direction and proportional to the velocity of an assumed wind.

7. The structure as claimed in claim 5, in which there is provided a movable means for supporting said course recorder for translatory movement thereon, said movable means being adapted to physically transport said course recorder in a direction and at a velocity corresponding to the direction and proportional to the velocity of an assumed wind, a record chart carried by said movable means upon which said course recorder is adapted to trace a record of the air track of the assumed flight of said aircraft, recording means carried by said movable means, and a stationary record chart upon which said last-named recording means is adapted to trace a record of the course of the assumed wind.

8. The structure as claimed in claim 5, including a chart-supporting surface upon which said course recorder is movable to record the air track of the assumed flight of the aircraft represented by said trainer, means for propelling said chart-supporting surface in translation in a direction and at a velocity equivalent to an assumed wind, tracing means carried by said surface for tracing the course of the assumed wind on a stationary record chart, and tracing means carried by the carriage representing the moving base, said last-named tracing means being adapted to trace the assumed course of the moving base on a stationary chart.

9. An aviation ground training system for teaching students the art of navigation of an aircraft to intercept a moving target object comprising: an aviation ground trainer rotatable in azimuth under the control of a student occupant, a course recorder directionally controlled by said trainer and movable over a record chart at a velocity proportional to the assumed velocity in flight of an aircraft represented by said trainer, a carriage movable in translation with a directional heading and velocity corresponding to the heading and proportional to the velocity of an assumed target object, a chart carried by said carriage having a marked point thereon representing said target object, and tracing means carried by said course recorder for tracing the assumed course of the aircraft represented by the trainer on said chart relative to the said marked point thereon representing the target object.

10. The structure as claimed in claim 9, in which there is provided means for bodily transporting said trainer course recorder in a direction and at a velocity corresponding to the direction and proportional to the velocity of an assumed wind.

11. The structure as claimed in claim 9, including a tracing means carried by said movable carriage, and a stationary record chart upon which said last-named tracing means is adapted to trace a record of the assumed course of said target object.

12. The structure as claimed in claim 9, including a second movable carriage movable in translation with a direction and velocity equivalent to an assumed wind, said second carriage having a supporting surface with a chart thereon, said course recorder being movable on said surface to record the air track of the assumed flight of said aircraft on the last-named chart.

13. The structure as claimed in claim 9, including a second carriage movable in translation in a direction and at a velocity corresponding to the direction and proportional to the velocity of an assumed wind, a supporting surface on said second carriage having a chart thereon and said course recorder being movable on said surface and adapted to trace a record of the air track of the assumed flight of the aircraft represented by said trainer on the chart carried by said surface, each of said carriages being provided with recording means adapted to cooperate with respective stationary record charts to trace thereon records of the course of the target object and the course of the assumed wind respectively.

14. In combination, a course recorder for tracing on a record sheet the flight course of an assumed aircraft represented by an associated ground trainer, a power-propelled carriage movable in translation with a velocity and direction proportional to the velocity and corresponding in direction to an assumed target object, a record sheet carried by said carriage and having a marked point thereon representing said target object, and tracing means carried by said course recorder adapted to trace the path of the assumed flight of said aircraft represented by the trainer on said record sheet relative to the marked point thereon representing said target object.

15. The structure as claimed in claim 14, in which there is provided a second power-propelled carriage movable in translation in a direction and with a velocity corresponding to the direction and proportional to the velocity of an assumed wind, said second carriage providing a supporting surface for supporting said course recorder for translatory movement thereon, a chart carried by said second carriage upon which the course recorder is adapted to trace a record of the air track of the assumed flight of said aircraft, and tracing means carried by said second carriage adapted to trace the course of the assumed wind on a record chart.

16. The structure as claimed in claim 14, including a second power-propelled carriage movable in translation in a direction and at a velocity corresponding to the direction and proportional to the velocity of an assumed moving base such as an aircraft carrier, a record chart carried by said second carriage having a marked point thereon representing said assumed moving base, and second tracing means carried by said course recorder adapted to trace the course of the assumed flight of said aircraft on the record sheet carried by said second carriage relative to the said marked point thereon representing the assumed target object.

17. The structure as claimed in claim 14, in which there is provided a second power-propelled carriage having a supporting surface with a record chart thereon, said surface supporting said course recorder for translatory movement thereon, said second carriage being adapted to be propelled in translation in a direction and at a velocity corresponding to the direction and proportional to the velocity of an assumed wind, a third power-propelled carriage adapted to be propelled in translation in a direction and at a velocity corresponding to the direction and proportional to the velocity of an assumed moving base such as an aircraft carrier, a chart carried by said third carriage having a marked point thereon representing said moving base, second tracing means carried by said course recorder and adapted to trace the course of the assumed flight of said aircraft relative to the marked point on the chart carried by said third carriage representing the assumed moving base, and individual tracing means carried by each of said carriages and adapted to trace the course of each carriage on a respective stationary record chart associated therewith.

18. In an aviation ground training system, a grounded trainer rotatable in azimuth under the control of a student occupant thereof, a course recorder directionally controlled by said trainer and movable over a supporting surface at a velocity proportional to the air speed of an assumed aircraft represented by said trainer, a pair of tracing means carried by said course recorder, a pair of power-propelled carriages each having a chart thereon, one of said carriages being movable in translation in a direction and at a velocity corresponding to the direction and proportional to the velocity of an assumed moving base such as an aircraft carrier, a marked point on said one carriage chart representing said moving base and one of said tracing means being adapted to trace the course of the assumed flight of said aircraft on the last-mentioned chart relative to said point thereon representing the moving base, the other of said carriages being movable in a direction and at a velocity corresponding to the direction and proportional to the velocity of an assumed target object, a marked point on the chart carried by said last-named carriage representing the assumed target object, and the other of said tracing means being adapted to trace a record on said last-mentioned chart representing the course of the assumed flight of said aircraft relative to the marked point representing the target object.

19. The structure as claimed in claim 18, including means for supporting said course recorder for translatory movement thereon, said means being adapted to be propelled in translation in a direction and at a velocity corresponding to the direction and proportional to the velocity of an assumed wind.

20. The structure as claimed in claim 18, including a wind-simulating carriage having a supporting surface with a chart thereon over which said course recorder is movable to trace a record of the air track of the assumed flight of the aircraft represented by said trainer, the wind-simulating carriage being adapted to be power-propelled in translation to physically transport the course recorder in a direction and at a velocity corresponding to the direction and proportional to the velocity of an assumed wind, and each of said carriages being provided with a tracing means adapted to trace the course thereof on an associated stationary chart thereby obtaining records of the respective courses of the assumed moving base, the assumed target object, and the assumed wind.

CARL W. MULLER.